United States Patent [19]

Chaloupka

[11] 4,344,727
[45] Aug. 17, 1982

[54] METHOD AND APPARATUS FOR STACKING AND COLLATING ARTICLES

[75] Inventor: Premysl G. Chaloupka, Gulf Breeze, Fla.

[73] Assignee: St. Regis Paper Company, New York, N.Y.

[21] Appl. No.: 188,998

[22] Filed: Sep. 22, 1980

[51] Int. Cl.³ .............................................. B65G 57/08
[52] U.S. Cl. ..................................... 414/36; 198/403; 198/412; 271/186; 271/210; 414/48; 414/52; 414/65; 414/80; 414/758; 414/786
[58] Field of Search ................. 414/28, 36, 48, 49, 414/52, 65, 80, 786, 758, 761, 762, 772; 271/185, 186, 210, 213, 221, 225; 198/403, 412

[56] References Cited
U.S. PATENT DOCUMENTS

| | | | |
|---|---|---|---|
| 2,774,487 | 12/1956 | Rounsefell et al. | 414/758 |
| 3,547,279 | 12/1970 | Radomski | 198/403 X |
| 3,612,300 | 10/1971 | Berghgracht | 414/80 X |
| 3,675,790 | 7/1972 | Avril | 414/80 X |
| 3,842,995 | 10/1974 | Dooley | 271/210 X |

Primary Examiner—Leslie J. Paperner
Attorney, Agent, or Firm—Joseph M. Maguire

[57] ABSTRACT

A conveyor accumulates collapsed, flexible flat tubes into roughly aligned stacks which are transferred to a collator comprising an inclined tray-like receptacle mounted for multidirectional movement. The receptacle is simultaneously rotated and pivoted from a loading station to a discharge station while being rapidly reciprocated to vibrate the roughly stacked tubes. The combined effects of gravity and vibration urge the tubes to shift relative to each other into engagement with adjacent sidewalls of the tray to align the stack. A pallet mounted for multidirectional movement at the discharge station is automatically indexed to allow the aligned stacks to be deposited at preselected locations on the pallet.

13 Claims, 5 Drawing Figures

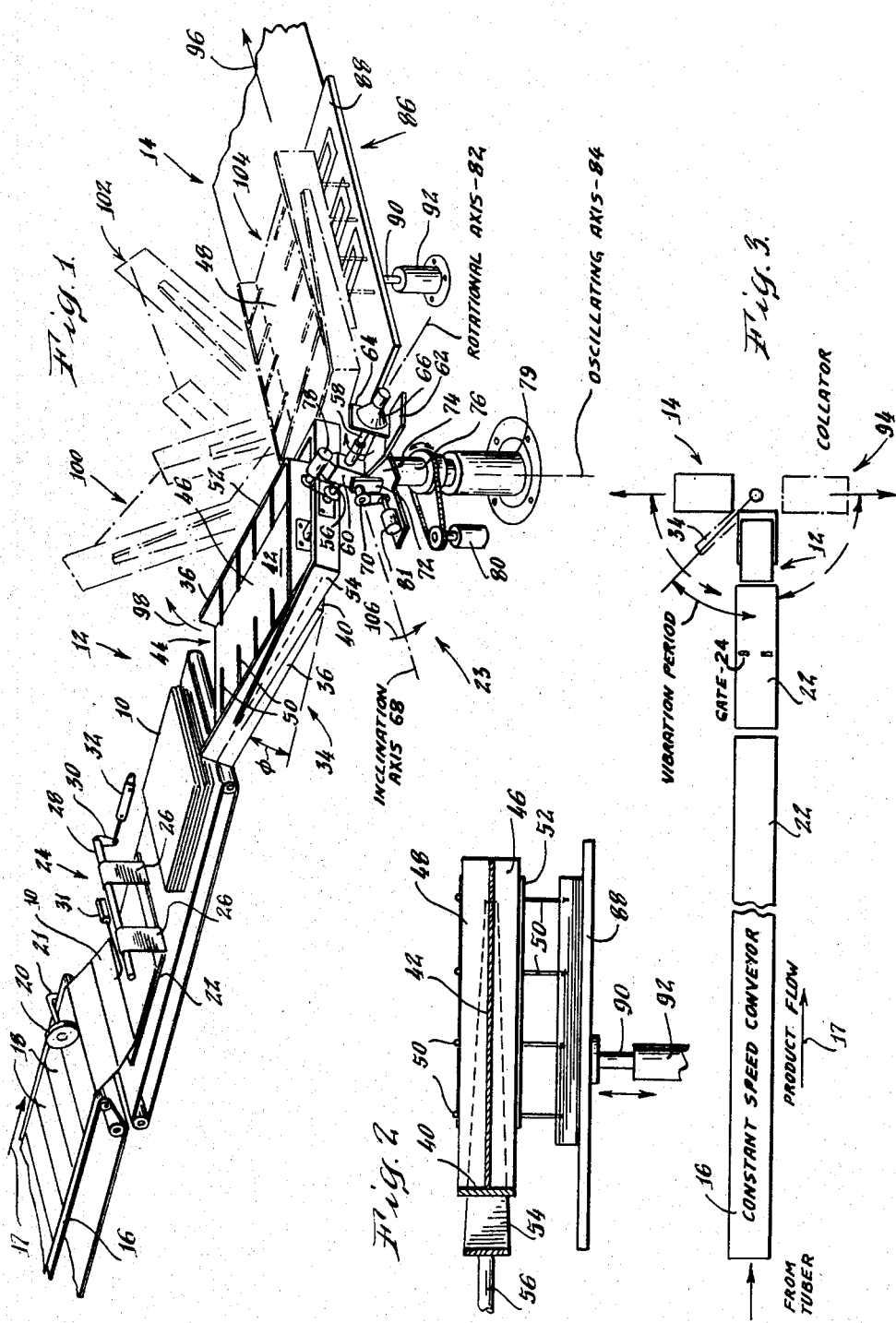

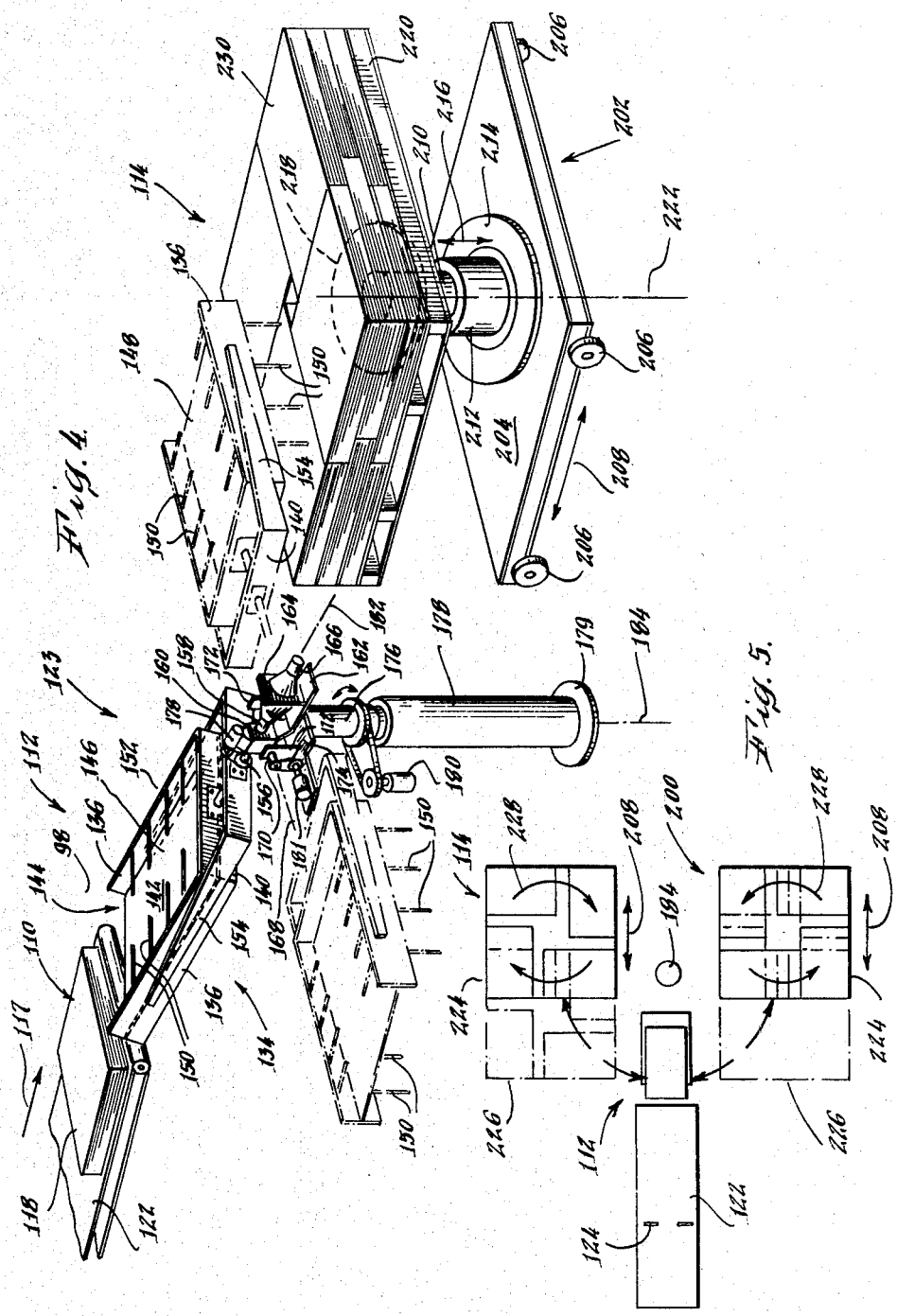

METHOD AND APPARATUS FOR STACKING AND COLLATING ARTICLES

TECHNICAL FIELD

This invention generally relates to industrial handling systems and deals more particularly with a method and apparatus for stacking and collating collapsed, flexible tubes.

BACKGROUND AND BRIEF DESCRIPTION OF THE INVENTION

Paper bags are normally manufactured by forming a sheet of paper or paper composite into a tube. These tubes are processed and initially handled while in an essentially flat, collapsed condition. The tubes are stored, packaged or shipped in stacks of multiple quantities thereof. Heretofore, it was necessary to manually align and "square-up" the stacks of collapsed tubes before the stacks were delivered to storage or subsequent production operations.

The present invention consists of a method and apparatus which not only aligns the tubes in each stack but also allows automated transfer of the aligned stacks to preselected stacking locations on a pallet or the like.

According to the present invention, a multi-section endless conveyor accumulates a preselected quantity of the collapsed tubes into a roughly aligned stack thereof and transports them into an inclined, tray-like receptacle which is mounted for multi-directional movement. The receptacle is gradually rotated 180° and rapidly reciprocated during rotation to vibrate the stack. The combined effects of gravity and vibration urge the tubes to shift relative to each other into engagement with adjacent sidewalls of the receptacle to align the stack. As the stack is rotated and vibrated, the receptacle revolves horizontally from a loading station adjacent the conveyor to a discharge station adjacent an automatically shiftable pallet system. The pallet system may be selectively operated to shift a pallet surface adjacent the discharge station between a plurality of preselected positions to provide indexed placement of the aligned stacks on the pallet surface.

DESCRIPTION OF THE DRAWINGS

In the drawings, which form an integral part of the specification and are to be read in conjunction therewith, and in which like parts are designated by like numerals in the various views:

FIG. 1 is a perspective view of a novel apparatus for stacking and collating articles according to the preferred method of the present invention;

FIG. 2 is a fragmentary, side view of the receptacle at the discharge station, showing an aligned stack of articles having been discharged to a pallet, parts of the receptacle being broken away in section for clarity;

FIG. 3 is a diagramatic, plan view of the apparatus of FIG. 1, showing the flow of the production from a source thereof to either of a pair of discharge stations;

FIG. 4 is a perspective view similar to FIG. 1 but showing an alternate form of an automated pallet assembly and, FIG. 5 is a diagramatic, plan view showing alternate modes of operation of the apparatus of FIG. 4.

DETAIL DESCRIPTION OF THE INVENTION

Referring first to FIGS. 1, 2 and 3, the present invention is concerned with a method and apparatus for receiving a plurality of articles from a source and collating them into a neat stack. The present invention is especially useful in connection with flexible, tubular type articles in an essentially collapsed, flat condition which may be later formed into bags. As described herein, each article comprises a sheet of material, such as paper or the like, folded over onto itself in flat or gusseted style to form a tube 18 which, when laid on one side thereof, assumes a collapsed state. The tubes 18 are formed by tuber apparatus, the construction of which is well known in the art and need not be described in detail here.

Tubes 18 are sequentially delivered away from the tuber, in shingled relationship by a continuously running high speed shingling conveyor belt 16 in the direction of the arrow 17. A selectively energizable conveyor belt 22 disposed at one end of and slightly below belt 16 receives tubes 18 as they fall by influence of gravity off the end of belt 16. Tubes 18 on belt 22 are delivered to a gate assembly 24 which comprises a rod 28 extending transversely above and intermediate the opposite extremities of belt 22. Rod 28 has a pair of transversely spaced flaps 26 secured thereto which extend downwardly toward the upper surface of belt 22 into blocking relationship with the flow of tubes 18 on belt 22. Rod 28 is journaled for rotational movement in suitable support structure (not shown) and has a connecting link 30 secured to one end thereof and coupled to an air cylinder 32. A circularly shaped stop member 20 is mounted above the discharge end of belt 16 by means of a vertically reciprocal arm 21 to allow the lower surface of the stop 21 to be selectively shifted into close proximity with the upper surface of belt 16. The input end of belt 22 underlaps the discharge end of belt 16, while the output end of belt 22 communicates with a loading station, generally designated by the numeral 12.

Collating and stacking apparatus of the present invention shown generally at 23 includes a receptacle, broadly designated by the numeral 34. Receptacle 34 includes two parallel, spaced apart sidewalls 36 having adjacent ends thereof connected by a third sidewall 40 which extends perpendicular to and between sidewalls 36. A bottom wall 42 extends between the sidewalls 36 and 40 and divides the receptacle 34 into first and second trays, 46 and 48, respectively, which are disposed in back-to-back, opposing relationship to each other. One end of each of the first and second trays 46 and 48, respectively, includes an opening 44 therein.

Means for selectively enclosing the upper areas of each of the trays 46 and 48 include a first and second set of longitudinally spaced finger elements 50. One end of each of the finger elements 50, in each set thereof, is secured to a longitudinally extending mounting bar 52 which is suitably mounted for pivotal movement about its longitudinal axis on the upper edge of the corresponding sidewall 36. Thus, the respective sets of finger elements 50 extend toward each other and are swingable about their respective mounting bars 52 away from the trays 46 and 48 to provide openings in the tops of the trays 46 and 48. Suitable structure (not shown) may be mounted on the side-walls 36 for engaging one or more of the finger elements 50 in each set thereof to limit the inwardly swinging movement thereof toward the bottom wall 42.

The receptacle 34 is mounted for sliding, reciprocal movement within a U-shaped bracket 54. A straight drive rod 58 is secured to the outer surface of the sidewall 40 of the receptacle 34 and is slidably received within a tube member 56 attached at the base of the U-shaped bracket 54. Drive rod 58 extends in a direction parallel to the planes of the sidewalls 36 and perpendicular to the plane of the sidewall 40. The tube 56, in turn, suitably secured to a mounting block 60 which includes an extension 62 extending rearwardly away from the receptacle 54. Extension 62 has an upstanding mounting plate 64 suitably anchored thereon. A vibrating motor 66 is secured to the mounting plate 64 and is operably coupled with one end of the rod 58. Motor 66 is commercially available and is particularly adapted to produce reciprocating movement of the rod 58 along the rotational axis 82 at a relatively rapid rate whereby to produce vibration of the receptacle 54. A conventional motor 78 is operably coupled with the rod 56 for causing it to rotate about axis 82.

A pin 70 extends transversely through and is secured to mounting block 60 and has its opposite ends journaled in a pair of upright supports 72 disposed on opposite sides of block 60 and welded to a platform 74. The pin 70 mounts the block 60 (and therefore the receptacle 34) and is coupled to a motor 81 for pivotal movement of the block and receptacle about the horizontal inclination axis 68. Platform 74 is secured to the upper end of a shaft 76 disposed within a flanged sleeve 79 suitably secured to a supporting surface. A motor 80 is suitably rigged to engage the shaft 76 and cause it to revolve about the vertical oscillating axis 84.

From the foregoing it is apparent that the receptacle 34 is mounted for multi-directional movement, i.e., pivotal motion about the inclination axis 68, rotation about the rotational axis 82, reciprocal movement along and parallel to the rotational axis 82, and revolving movement about the oscillating axis 84.

The pallet assembly 86 comprises an essentially flat, horizontally extending pallet surface 88 which is selectively shiftable in a vertical direction by means of a hydraulically operated piston and cylinder combination 90 and 92 which is suitably attached at its base to a supporting surface. The upper end of piston 90 is appropriately attached to the undersurface of the pallet surface 88. Although shown herein as a stationary member, the pallet surface 88 may comprise an elevatable conveyor line for moving articles thereon in the direction of the arrow 96 away from the discharge station 14.

Turning now to a description of the operation of the apparatus and method of the present invention, individual tubes 18 are sequentially delivered by conveyor belt 16 to the output end thereof and fall by gravity onto the input end of conveyor belt 22. At this point, the belt 22 is in a stationary de-energized condition, consequently the tubes 18 which fall onto the input end of belt 22 are sequentially stacked in rough alignment on top of each other until a desired number, as determined by a counter 31, of the tubes 18 form a roughly aligned stack 10 thereof. Counter 31 is suitably connected to belt 22 and cylinder 32 to simultaneously start the belt 22 and raise the flaps 26 when the stack 10 contains a certain number of tubes. When a stack 10 containing the predetermined number of tubes 18 therein has been formed at the input end of belt 22, cylinder 32 and belt 22 are energized to raise flaps 26, and move stack 10 toward receptacle 34.

The stack 10 is delivered to the output end of the belt 22 and through the opening 44 of the first tray 46 of the receptacle 34. The bottom wall 42 of the receptacle 34 is inclined with respect to the horizontally extending upper surface of belt 22 by an angle $\phi$, which angle $\phi$ is preferably approximately 15°. By virtue of the inclination of the bottom wall 42, the stack 10 slides under the influence of gravity through the opening 44 and downwardly into the tray 46 between the bottom wall 42 and the retaining finger elements 50. With a roughly aligned stack 10 in the tray 46, motor 78 is energized to cause rod 56 to rotate about axis 82, thereby likewise rotating the receptacle 34 about axis 82, while motor 80 is simultaneously energized to cause rod 76 to oscillate about axis 84, thereby likewise causing receptacle 34 to rotate toward the discharge station 14 about the axis 84.

Upon commencement of the rotation of receptacle 34 about axis 82, motor 66 is energized to produce rapid reciprocal movement of the receptacle 34 within the U-shaped bracket 54, thereby vibrating the stack 10 within the tray 46. As the receptacle 34 is oscillated 45° about axis 84 and rotated 90° about axis 82 in the direction of the arrow 98, gravity acts upon the stack 10 within the tray 46 and urges the stack 10 toward both the sidewall 40 and the lower one of the sidewalls 36. Vibration of the tray 46 during this interval of rotation about axis 82 causes the individual tubes 18 in the rough stack 10 thereof to shift relative to each other as each of the tubes 18 slides toward the sidewall 40 and the adjacent lower sidewall 36. Through the combined effects of vibration and gravity, adjacent edges of each of the tubes 18 are brought into abutting contact with the sidewall 40 and the adjacent lower sidewall 36, thereby precisely aligning the tubes 18 in the rough stack thereof. When the receptacle is oscillated 45° and rotated 90° from its starting position at station 12, the motor 66 is de-energized thereby terminating vibration of the receptacle 34. The rotational movement about axis 82 and 84 is continued as the receptacle 34 assumes the positions indicated by phantom lines in FIG. 1 and designated by the numerals 100, 102 and 104. While the receptacle 34 is revolving through 90° about the axis 82, motor 81, is energized to cause rotation of pin 70 and pivotal movement of rod 56 in the direction of the arrow 106 about the inclination axis 68 from the inclined position of the rod to an essentially horizontal position.

As the receptacle 34 is rotated about axis 82 beyond 90° and about axis 84 beyond 45° from its starting position, the influence of gravity begins to urge the perfectly aligned stack of the tubes 18 within the tray 46 outwardly against the finger elements 50. Mounting bars 52 possess sufficient friction in their rotatable mountings to prevent outward swinging of the associated finger elements 50 until a predetermined magnitude of force is applied thereto. This magnitude of force will correspond to the full weight of the perfectly aligned stack of tubes 18, such that the finger elements 50 are prevented from opening under the influence of gravity until the tray 46 is essentially aligned immediately above the pallet surface 88, which occurs when the receptacle 34 is in the position shown by the numeral 104 in FIG. 1. As the receptacle 34 assumes the position 104 at the discharge station 14, the finger elements 50 swing downwardly and outwardly to allow the perfectly aligned stack of tubes 18 to drop under the influence of gravity onto the pallet surface 88. At this point, pallet surface 88 has been shifted to a predetermined elevation to receive the stack of tubes 18 thereon. In the event that the pallet assembly 86 is provided with means for conveying the stacks of tubes 18 away from the discharge station 14, the pallet surface 88 may remain at a constant level. However, in the absence of such a conveyor, the cylinder 92 may be successively actuated to lower the pallet surface 88 in order that multiple quantities of the aligned stacks of tubes 18 may be stacked on top of each other.

After a perfectly aligned and collated stack of tubes 18 has been deposited on the pallet surface 88, the receptacle 34 is rotated in a counter-clockwise direction, as viewed in FIG. 3, about the axis 84 until the opening 44 of the receptacle 34 is aligned with the discharge end of belt 22. Simultaneous with the return of the receptacle 34 to the loading station 12, rod 56 is pivoted about the inclination axis 68 to incline the bottom wall 42 to the angle $\phi$ from a horizontal plane. At this point, it can be appreciated that the second tray 48 is positioned in a receiving position at the loading station 12 in readiness to receive the next roughly aligned stack 10 therein.

After a preselected number of the tubes 18 have dropped onto the input end of belt 22, arm 21 is shifted downwardly thereby bringing the stop 20 into close proximity to the upper surface of belt 16 in order to engage the tubes 18 moving toward the input end of belt 22. With belt 16 continuing to move, the tubes 18 engage the stop 20 and begin to accumulate in overlapping, roughly stacked relationship at the output end of belt 16. After a stack 10 has passed through the gate 24 and has been discharged into the receptacle 34, conveyor belt 22 is de-energized, flaps 26 are lowered to their tube blocking position, and arm 21 is shifted upwardly to raise the stop 20, thereby allowing the roughly stacked tubes at the output end of belt 16 to drop onto the input end of belt 22.

As shown in FIG. 3, receptacle 34 is rotated about axis 82 through an arc of 90° when receptacle 34 has revolved approximately 45°, in a clockwise direction, about the axis 84. Preferably, the roughly aligned stack 10 of tubes 18 within the receptacle 34 is vibrated for a duration of approximately the period during which the receptacle 34 revolves through the 45° of rotation about axis 84. Also, the apparatus 23 may be operated in a manner to revolve the receptacle 34 in a counter-clockwise direction about axis 84 to a second discharge station 94, similar to discharge station 14 but displaced 180° about axis 84 from discharge station 14. Further, the receptacle 34 may be alternately revolved as described between the loading station 12 and discharge stations 14 and 94.

Attention is now directed to FIGS. 4 and 5 wherein an alternate form of the present invention is depicted, which is similar in many respects to the apparatus described above. Components shown in FIGS. 4 and 5 which are identical to those previously described will be designated by like reference numerals preceded by the numeral "1". A rough stack 110 of tubes 118 is delivered by belt 122 to the receptacle 134 as described previously. Apparatus 123, previously discussed in detail, is provided for simultaneously vibrating, rotating, tilting and revolving the receptacle 134 to a discharge station 114 exactly in the manner already discussed. As shown in FIG. 5, the receptacle 134 may be revolved about the axis 184, alternately between the discharge station 114 and discharge station 200.

A novel pallet assembly generally designated by the numeral 202 is located at both the discharge stations 114 and 200. Pallet assembly 202 includes a lower, rectangularly shaped base 204 having a wheel 206 rotatably mounted on each of the corners thereof to allow movement of the base 204 in a linear direction designated by the arrow 208. The wheels 206 are supported by any suitable underlying surface, and may be captively held in a track (not shown) to assure movement in the direction of the arrow 208. Base 204 includes an extensible piston and hydraulic cylinder combination 210 and 212, respectively, centrally mounted thereon by means of a circularly shaped flange 214. Piston 210 has its longitudinal axis extending in an essentially vertical direction and may be selectively vertically shifted in the direction of the arrow 216 upon actuation of means (not shown) for controlling the cylinder 212. Piston 210 has mounted on the upper surface thereof a circular plate 218, which in turn supports a rectangularly shaped pallet 220. Pallet 220 may be removably mounted on the plate 218, if desired. Piston 210 is rotatable about an axis 222 within the cylinder 212 to allow rotation of the plate 218, and therefore the pallet 220, about an essentially vertical axis. From the foregoing, it is apparent that the pallet assembly 202 is mounted for multidirectional movement which allows a high degree of flexibility in indexing specific locations on the pallet 220 with respect to the receptacle 134 when the latter is positioned at the discharge station 114.

As shown in FIG. 5, the pallet assembly 202 may be shifted in the direction of the arrow 208 between one position thereof indicated by the full lines 224 and another position thereof indicated by the broken lines 226. Simultaneously, the pallet 220 may be rotated in the direction of the arrows 228 in order to expose various locations on the pallet 220 beneath the receptacle 134 at the discharge stations 114 and 220. By this apparatus and method of operation, the perfectly aligned stacks 230 may be placed on the pallet 220 in superimposed, angularly offset, interleafed relationship as best seen in FIG. 4.

From the foregoing, it is apparent that the present invention not only includes novel apparatus for stacking and collating a plurality of similarly configured, generally flat articles, but involves a novel method therefor which includes the steps of stacking the plurality of articles in superimposed, roughly aligned relationship to each other; tilting the roughly aligned stack of articles along a first edge thereof; rotating the roughly aligned stack of articles about a second edge thereof adjacent the first edge; vibrating the roughly aligned stack of articles to cause the same to shift relative to each other; and, supporting the first and second edges of the roughly aligned stack while vibrating the stack in order to align the edges of the articles thereby collating and aligning the roughly aligned stack.

It is apparent that the method disclosed herein not only provides for the reliable accomplishment of the object of the invention but does so in a particularly simple and effective manner. It is recognized, of course, that those skilled in the art may make various modifications or additions to the preferred embodiment disclosed herein without departing from the spirit and scope of the present contribution of the art. Accordingly, it is to be understood that the protection sought and to be afforded hereby should be deemed to extend to the subject matter claimed and all equivalents thereof fairly within the scope of the invention.

I claim:

1. Apparatus for stacking and collating similarly configured, generally flat articles, comprising:
   structure defining a receptacle adapted for holding a plurality of articles in non-aligned, roughly stacked relationship therewithin, the receptacle having an opening therein through which the articles may pass into the receptacle and being provided with a pair of adjacent sidewalls respectively extending along a corresponding pair of adjacent edges of each of the articles; and means connected with the receptacle for mounting it for multidirectional movement including (1) means for rotating the receptacle about a first reference axis extending in a direction essentially parallel to the plane defined by one of said sidewalls, whereby to urge one edge of each of the articles toward said one sidewall by the influence of gravity, (2) means for tilting the receptacle about a second reference axis extending in a direction generally perpendicular to the first reference axis, whereby to urge the other edge of each of the articles to shift under the influence of gravity toward the other of said sidewalls, (3) means for revolving the receptacle about a third reference axis extending in a direction perpendicular to the second axis from a loading position to a discharge position; and (4) means for causing the receptacle to vibrate upon rotation and tilting of the receptacle, said last named means cooperating with the rotating means and tilting means to urge each of the articles to shift relative to each other and into contact with said sidewalls whereby to align the pair of edges of each of the articles to produce an aligned stack thereof.

2. The apparatus of claim 1, wherein the second axis extends in a horizontal direction and the third axis extends in a vertical direction.

3. The apparatus of claim 1, wherein the receptacle comprises a first tray having one end and the top thereof essentially open, and means shiftably connected to the first tray for selectively closing its open top.

4. The apparatus of claim 3, wherein the receptacle further comprises a second tray having one end and the top thereof essentially open, and means shiftably connected to the second tray for selectively closing its open top, the second tray being disposed in back-to-back opposition to the first tray and separated from the latter by a common bottom wall therebetween.

5. The apparatus of claim 1 including a base, the revolving means being revolvably mounted on the base, the tilting means being pivotally mounted on the revolving means, PS and the rotating means being pivotally mounted on the tilting means.

6. The apparatus of claim 1, wherein the vibrating means includes bracket means connected to the tilting means and mounting the receptacle for reciprocal motion in a direction parallel to the first reference axis, and motor means connected to the receptacle for causing it to reciprocate relative to the bracket means.

7. The apparatus of claim 1, including:

conveyor means for delivering the articles from a source thereof to the receptacle at the loading position thereof;

shiftable blocking means adjacent the conveyor means and intermediate the source of articles and the loading position for selectively blocking travel of the articles along the conveyor means whereby to accumulate a preselected quantity of the articles in a rough stack thereof.

8. The apparatus of claim 1, including shiftable pallet means at the discharge station for receiving aligned stacks of the articles from the receptacle, the shiftable pallet means comprising:

a support surface adapted to support a plurality of the aligned stacks of articles in side-by-side relationship thereon, a base adapted for linear movement in one direction, a selectively elevatable mounting member secured to the base, and means for rotatably mounting the support surface on the mounting member.

9. A method for stacking and collating a plurality of similarly configured generally flat articles utilizing a receptacle having first and second trays disposed in back-to-back relation and each formed with a pair of adjacent sidewalls, the method comprising the steps of (a) stacking the articles in superimposed roughly aligned relationship to each other at a loading station, (b) tilting the receptacle about a first axis, (c) delivering the articles so stacked from the loading station to the first tray of the tilted receptacle so that one edge of each of the articles shifts under the influence of gravity toward one of the sidewalls of the first tray, (d) revolving the receptacle about a second axis extending in a direction generally perpendicular to the first axis from the loading station to a discharge station, while (1) rotating the receptacle about a third axis extending in a direction perpendicular to the first axis to urge another edge of each of the articles to shift under the influence of gravity toward the other sidewall of the first tray, (2) vibrating the receptacle to urge each of the articles to shift relative to each other and into contact with said sidewalls of the first tray to align said edges of the articles, and (3) causing the receptacle to assume a substantially horizontal position, (e) transferring at the discharge station the aligned stack of articles from the first tray to a pallet, and (f) revolving the receptacle about the second axis from the discharge station to the loading station, while returning the receptacle to its original position of tilt relative to the loading station for loading of another stack of roughly aligned articles into the second tray.

10. A method of stacking and collating a plurality of similarly configured generally flat articles utilizing a receptacle formed with a pair of adjacent sidewalls, the method comprising the steps of (a) stacking the articles in superimposed roughly aligned relationship to each other at a loading station, (b) tilting the receptacle about a first axis, (c) delivering the articles so stacked from the loading station to the tilted receptacle so that one edge of each of the articles shifts under the influence of gravity toward one of the sidewalls of the receptacle, (d) revolving the receptacle about a second axis extending in a direction generally perpendicular to the first axis from the loading station to a discharge station, while
  (1) rotating the receptacle about a third axis extending in a direction perpendicular to the first axis to urge another edge of each of the articles to shift under the influence of gravity toward the other sidewall of the receptacle,
  (2) vibrating the receptacle to urge each of the articles to shift relative to each other and into contact with said sidewalls of the receptacle to align said edges of the articles, and
  (3) causing the receptacle to assume a substantially horizontal position, and (e) transferring at the discharge station the aligned stack of articles from the receptacle to a pallet.

11. The method of claim 10, wherein step (d) (2) is performed by reciprocating the roughly aligned stack of articles in a plane parallel to the planes of the articles.

12. The method of claim 10, wherein step (d) (1) is performed by rotating the aligned stack of articles 180°.

13. The method of claim 10 further comprising the step of revolving the receptacle about the second axis from the discharge station to the loading station, while returning the receptacle to its original position of tilt relative to the loading station for loading of another stack of roughly aligned articles into the receptacle.

* * * * *

UNITED STATES PATENT AND TRADEMARK OFFICE
CERTIFICATE OF CORRECTION

PATENT NO. : 4344727
DATED : August 17, 1982
INVENTOR(S) : P. Chaloupka

It is certified that error appears in the above—identified patent and that said Letters Patent is hereby corrected as shown below:

In claim 5, column 7 line 55 of the patent, delete "PS".

Signed and Sealed this

Twenty-sixth Day of October 1982

[SEAL]

Attest:

Attesting Officer

GERALD J. MOSSINGHOFF

Commissioner of Patents and Trademarks